UNITED STATES PATENT OFFICE.

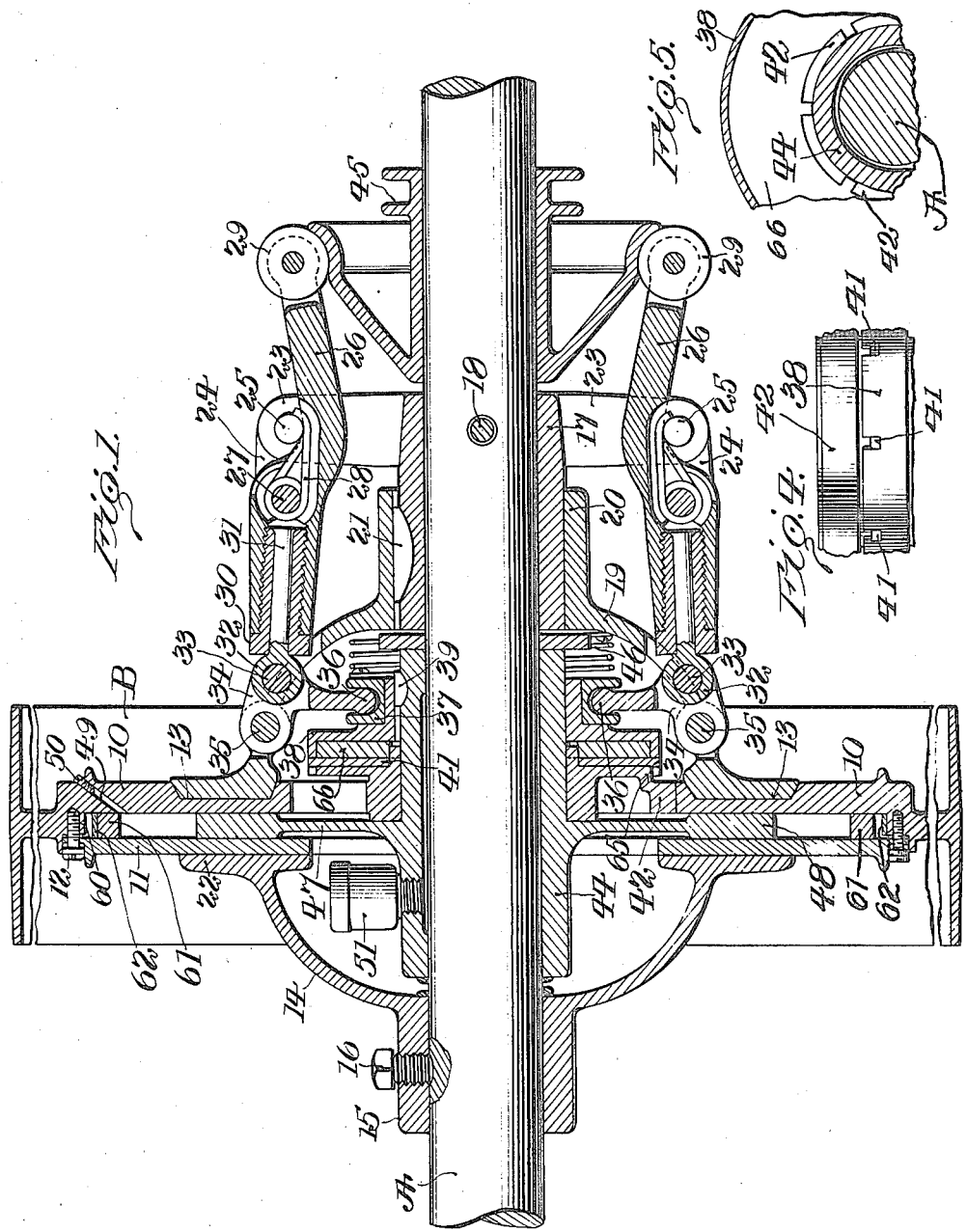

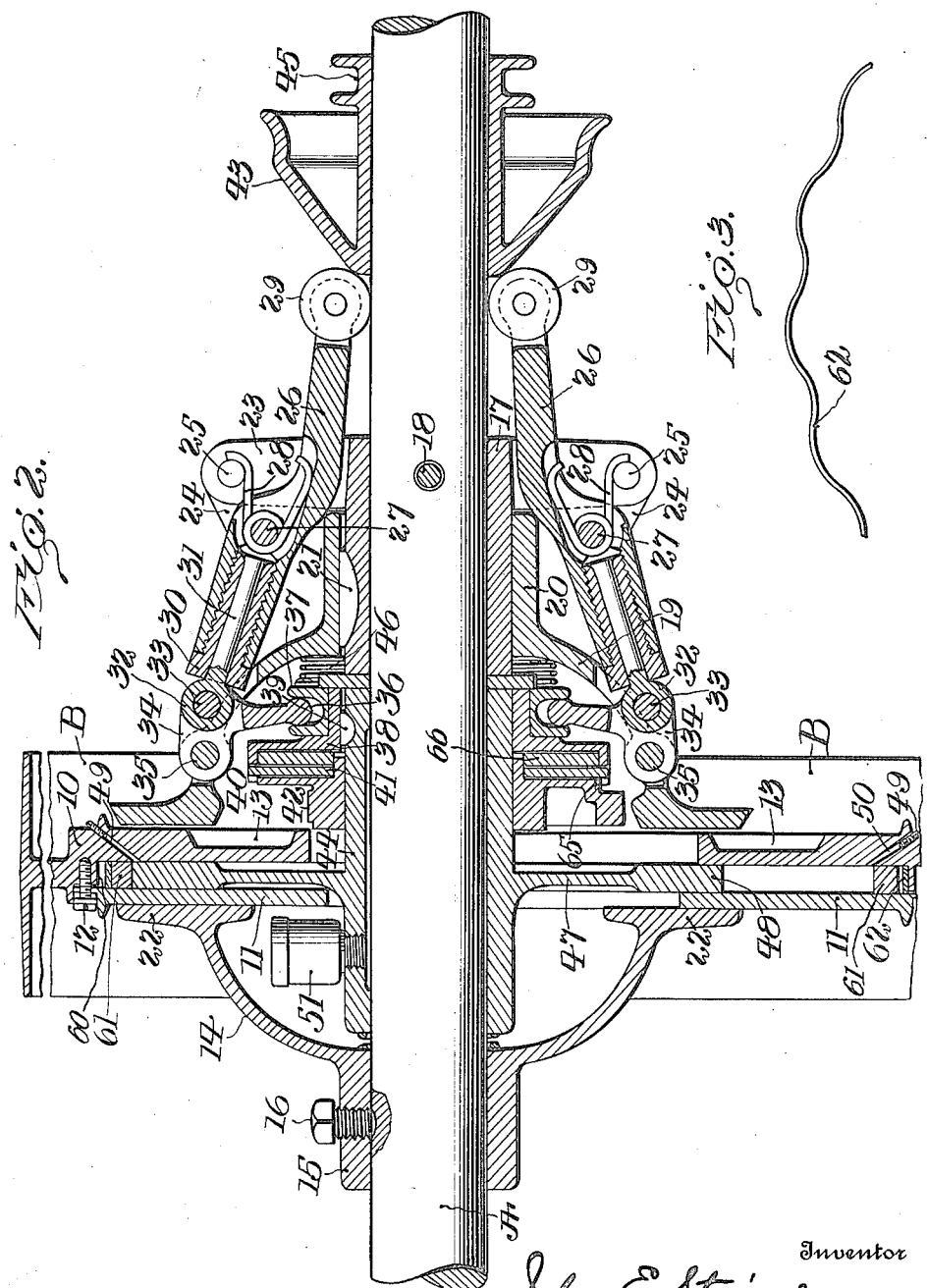

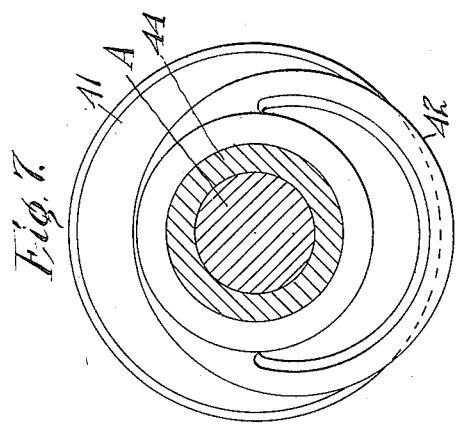
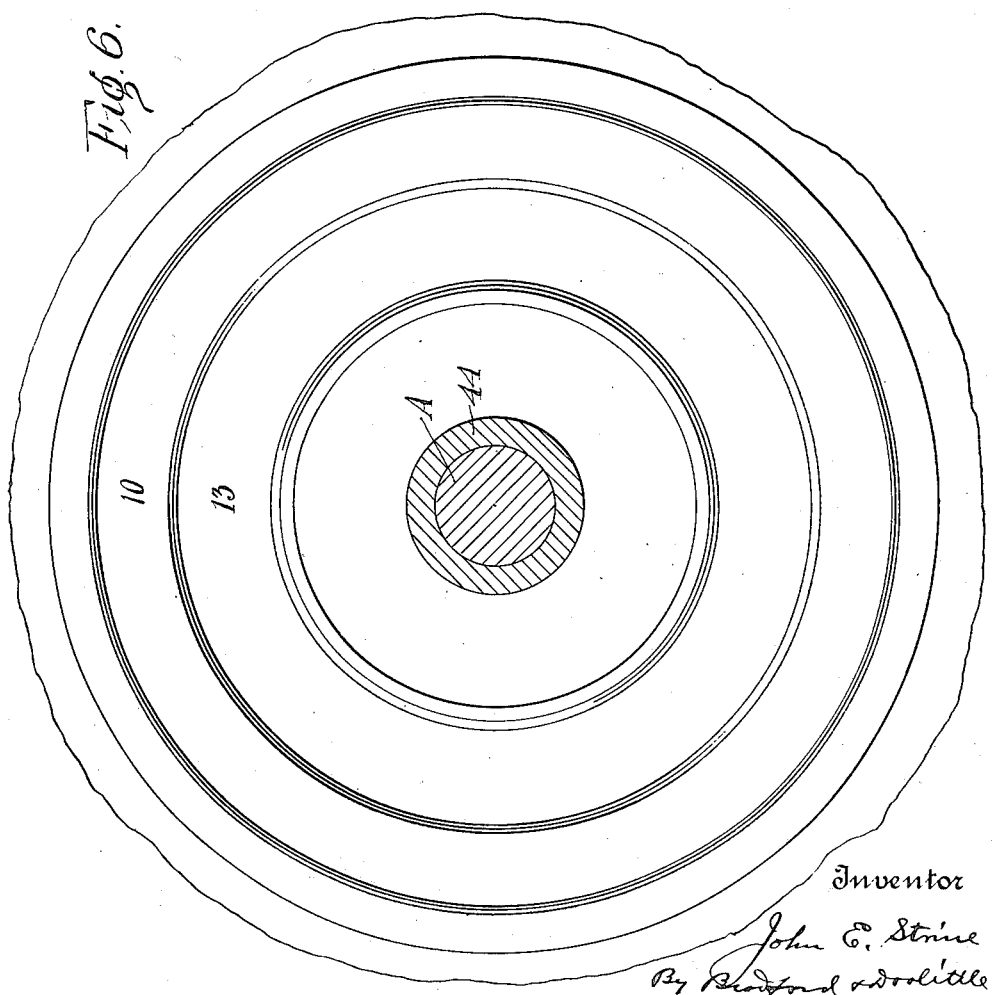

JOHN E. STRINE, OF WAYNESBORO, PENNSYLVANIA.

CLUTCH MECHANISM.

1,280,327.  Specification of Letters Patent.  Patented Oct. 1, 1918.

Application filed April 30, 1915. Serial No. 24,990.

*To all whom it may concern:*

Be it known that I, JOHN E. STRINE, a citizen of the United States, residing at Waynesboro, Franklin county, and State of Pennsylvania, have invented and discovered certain new and useful Improvements in Clutch Mechanism, of which the following is a specification.

My said invention consists in an improved clutch for securing pulleys to shafting, either driving or driven shafting, in a manner whereby, when the clutch is released, the pulley will be allowed to slide bodily at right angles to the axis of the shaft in the direction from which the strain comes on the belt, thus relieving the belt used for transmitting motion of such strain immediately upon the release of the clutch. My said invention further consists in providing a rigid and convenient means for coupling up said clutch when it is desired to start the parts in operation, all as will be hereinafter more fully described and claimed.

Referring to the accompanying drawings, which are made a part hereof and on which similar reference characters indicate similar parts, Figure 1 is a longitudinal section through a clutch mechanism as mounted upon a shaft, illustrating the parts of the mechanism as when in use, Fig. 2 a similar view, illustrating the position of the parts when unclutched or out of use, Figs. 3, 4 and 5, detail views showing the form of parts more clearly.

Fig. 6 is a transverse sectional view, and

Fig. 7 is a detail view in elevation of the cam disk.

In said drawings, the portions marked A represent the shaft and B the pulley, both of which parts are, or may be, of any approved construction, it being understood that the shaft A may be either the power shaft from which power is to be transmitted through the medium of pulley B and any belt mounted thereon, or it may be the driven shaft to be driven from the source of power by a belt mounted on pulley B.

Said pulley B is floatingly mounted radially of the shaft and is formed with the web 10, having a circumferential shoulder 60 a short distance inside its periphery, and has another plate 11 secured thereto by screws or bolts 12, providing a space between in which a friction disk on the shaft may operate, as will be presently described. A ring 61 is mounted in said recess just within shoulder 60, and an undulated spring 62, of a form shown in Fig. 3, is interposed between said ring and said shoulder to form a cushion for the pulley when in released or uncoupled position, or when a great amount of pressure is suddenly brought against the cam in centering. In the outer face of web 10 is formed a circumferential recess 13 having tapered outer and inner shoulders, as shown.

A hollow member 14 of semi-spherical form, with a hub 15, is rigidly secured to shaft A by set-screw 16 and has an annular outer rim 22 with a vertically disposed face which bears against the outer face of plate 11, furnishing an abutment to take the thrust of said parts when the coupling takes place. A sleeve 17 is mounted on said shaft A, being secured thereto by a transverse pin 18, and said sleeve carries a hollow member 19, of a form somewhat similar to member 14, formed with a hub 20 which is splined on said sleeve by a key 21, as shown.

The outer rim of said member 19 is formed to fit in the annular recess 13 in the adjacent face of the web 10 when the parts are in operative position. A transverse arm 23 is secured or formed on the outer end of sleeve 17 and carries at its outer ends a pair of links 24 mounted on pivots 25. Levers 26 are pivoted on the other end of said links on pivots 27. Springs 28 are mounted around pivots 27 and bear one end against pivots 25 and the other end against levers 26, and normally tend to hold the outer ends of said levers 26 with their friction roller 29 in contact with the surface of shaft A as in Fig. 2. The opposite ends of levers 26 are formed with screw-threaded perforations in which are mounted screw-threaded thimbles 30, carrying the shanks 31 of eye-bolts 32, in which are mounted pivots 33 on which angle levers 34 are mounted. Said angle levers operate in slots in opposite sides of the member 19 and are pivoted thereto on pivots 35. The opposite arm of each of said angle levers has a ball-shaped end 36 which engages in a circumferential groove in a collar 37 mounted on the flange of a sliding member 38 which is secured on a sleeve 44 on shaft A by a key 39. Said member 38 has an outer horizontal flange 40 which incloses a friction plate 41, which is secured to rotate therewith by slots in the rim and radial projections on the plate which engage said slots, as shown in Fig. 4. A cam disk or eccentric 42 is mounted on sleeve 44 and formed with an annular shoulder 65 adapted to fit within said rim 40 of member 38. A friction disk 66 is preferably interposed between disk 41 and member 38, being secured to rotate with cam 42 by interengaging slots and engaging projections, as shown in Fig. 5. A cone 43 is mounted to slide on shaft A, adjacent to sleeve 17, being formed with a collar having a circumferential groove 45 in which a shifting fork (not shown) is adapted to operate. A spring 46 is connected at one end to member 19 and at its other end to collar 37, and interposed between said parts for the purpose of normally holding them in released position. The sleeve 44 is formed with an annular web 47 having its outer edge thickened to form a friction rim 48 adapted to fit between the web 10 and plate 11 of the pulley B. An aperture 49 is formed in the side of web 10, closed by a screw-plug 50, through which lubricant may be introduced to the interior of the parts. An oil cup 51 is also mounted on sleeve 44, as shown.

In operation, the parts being assembed as shown in Fig. 2, and it being desired to clutch the pulley B to shaft A, cone 43 is slid toward the pulley, the nose of the cone sliding under the friction rollers 29 of the levers 26 and forcing said levers outward, bringing links 24 into a substantial horizontal position, with the pivots 27 in line with the pivots 25 and throwing the rim of member 19 against the face of web 10. At the same time the arms 36 of levers 34 force the cam 42 to within the aperture of the web 10 and against the adjacent face of the web 47, starting said cam into rotation and operating to center pulley B upon the shaft so that the friction rim of the part 19 will come into the friction recess 13 of the rim 10, thus clutching said pulley to said shaft and serving to transmit motion either from the shaft to the pulley, or from the pulley to the shaft, the parts being then in a position illustrated in Fig. 1. When it is desired to release the clutch, cone 43 is slid in reverse direction allowing arms 26 to fall with the links 24 into an inclined position and withdrawing the clutch part of member 19 from engagement with the web 10 and allowing the pulley to slide on the web 47 of the sleeve 44 in the direction of the strain of the pulley. By thus shifting the cone 43 the whole apparatus is adjusted to secure the desired operative results, as will be readily seen.

It will be understood from the foregoing that in the arrangement where the driving power is applied to the shaft and transmitted through the clutch mechanism to the pulley and from the pulley to the parts to be driven, the pulley will have a tendency to stand still until the cam 42, driven by the shaft, has centered the pulley, when the main clutch falls into place and drives said pulley. In the reverse arrangement, the clutch and shaft will have a tendency to stand still until the cam 42, driven by the pulley through sleeve 44 and disk 47, centers the pulley, when the main clutch falls into position and drives the shaft. The operation is always to center the pulley and tighten the belt before applying the power, which, in starting heavy loads, is very important. The cam is driven and the pulley centered by the part running before the part geared to the load is started. When the power is transmitted from pulley B through shaft A to the load, the cam 42 will be rotated to center said pulley through the frictional contact between the plate 11 and the rim 48 of the disk 47, which frictional contact will be sufficient for this purpose until the clutch is set and the load applied. When the operation is the reverse, that is, when the power is transmitted from the shaft through the pulley to the load, pulley B will stand idle until it is centered and the belt tightened, the shoulder of part 10, on which plate 11 is mounted, holding said plate so that the space between it and the face of part 10 permits the rotation of disk 47 without turning said pulley until the pressure of the parts after the pulley is centered becomes great enough to slightly spring said plate 11 inward under the thrust between the outer rim of member 19 and the rim 22 of member 14.

Having thus fully described my said invention, what I claim as new and desire to secure by Letters Patent, is:

1. A power transmission mechanism comprising a shaft, a pulley floatingly mounted radially of the shaft, means axially shiftable on the shaft for centering the pulley, means associated with said centering means for coupling the pulley to the shaft, and means for actuating said centering and coupling means, substantially as set forth.

2. A power transmission mechanism comprising a shaft, a pulley movable transversely of the axis of the shaft, means mounted eccentric of the shaft operable to center the pulley relative to the shaft, means associated with said centering means for coupling the pulley to the shaft, and means for actuating said centering and coupling means, substantially as set forth.

3. A power transmission mechanism comprising a shaft, a pulley floatingly mounted radially of the shaft, a clutch element secured to the shaft operable to engage the pulley for rotation, means for acuating said clutch element, and means operable through said clutch actuating means to initially center the pulley for engagement by the clutch element, substantially as set forth.

4. A power transmission mechanism comprising a shaft, a pulley floatingly mounted radially of the shaft, a clutch element mounted on the shaft operable to engage the pulley for rotation, and an eccentric shiftable axially of the shaft operable to initially center the pulley for engagement by the clutch element substantially as set forth.

5. As a part of a power transmission mechanism, a shaft, a pulley mounted on said shaft to move across the axis thereof, a clutch mechanism for coupling and uncoupling said pulley to said shaft, said clutch mechanism embodying a cam disk operable from the driving member and adapted to engage with the pulley when the coupling is about to take place and center said pulley on said shaft, substantially as set forth.

6. As a part of a power transmission mechanism, the combination of a shaft, a pulley mounted on said shaft to move across the axis thereof, means carried by said shaft for supporting and guiding said pulley, clutch mechanism for coupling said pulley to said shaft, and a cam adapted to be clutched to said shaft to rotate therewith when the coupling is about to take place and arranged to engage with said pulley for centering the same on said shaft, substantially as set forth.

7. The combination of a shaft, a pulley mounted on said shaft to move across the axis thereof, a supporting and guiding disk secured to said shaft and engaging with said pulley, a rigid abutment secured to said shaft alongside said pulley, a movable clutch part mounted on the other side of said pulley and adapted to engage with the web thereof opposite to said abutment, means for operating said clutch part, a cam disk also mounted on said shaft and arranged to engage and center said pulley, and means connected with the clutch operating means for securing said cam to turn with said shaft when the coupling is being made, substantially as set forth.

8. The combination of a shaft, a pulley mounted thereon to move across its axis, means for centering said pulley on said shaft comprising a cam, a clutch mechanism for coupling and uncoupling said cam to said shaft, a clutch mechanism for coupling and uncoupling said pulley to said shaft, and a single means for operating said several parts, substantially as set forth.

9. The combination of a shaft, a pulley mounted thereon to move across the axis thereof, a clutch mechanism for securing said pulley to said shaft embodying pivoted levers mounted on links carried by a sleeve secured to said shaft, a sliding cone for operating said levers, a cam for centering said pulley, frictional means for securing said cam to said shaft, and a connection between said levers and said frictional means for setting the same when the clutch is to be coupled, substantially as set forth.

10. The combination of a shaft, a pulley mounted to move across the axis of said shaft, clutch mechanism for securing said pulley to said shaft, a cam for centering said pulley, a frictional clutch for securing said cam to said shaft, and means for operating said two clutches comprising pivoted levers and links connected with a single operating means, substantially as set forth.

In witness whereof, I have hereunto set my hand and seal at Waynesboro, Pennsylvania this 29 day of April, A. D. nineteen hundred and fifteen.

JOHN E. STRINE. [L. S.]

Witnesses:
 IRA N. HOOVER,
 ELSWORTH FITZ.